United States Patent
Petzold

[11] Patent Number: 5,900,821
[45] Date of Patent: May 4, 1999

[54] RAIN SENSOR SYSTEM FOR A MOTOR VEHICLE

[75] Inventor: Sven Petzold, Wiesbaden, Germany

[73] Assignee: VDO Adolf Schindling AG, Frankfurt, Germany

[21] Appl. No.: 08/820,135

[22] Filed: Mar. 14, 1997

[30] Foreign Application Priority Data

Nov. 5, 1996 [DE] Germany .................. 196 19 116

[51] Int. Cl.$^6$ .................................................. G08B 21/00
[52] U.S. Cl. .................. 340/604; 340/602; 318/444; 318/483; 318/DIG. 2
[58] Field of Search ................................. 340/602, 604; 318/444, 483, 460, DIG. 2; 15/215.001

[56] References Cited

U.S. PATENT DOCUMENTS

| | | | |
|---|---|---|---|
| 3,794,847 | 2/1974 | Cadiou | 307/117 |
| 4,589,771 | 5/1986 | Watanabe et al. | 356/38 |
| 4,705,998 | 11/1987 | Millerd et al. | 318/444 |
| 4,897,585 | 1/1990 | Millerd et al. | 318/483 |
| 5,306,992 | 4/1994 | Droge | 318/483 |
| 5,572,765 | 11/1996 | Guell | 15/250.06 |
| 5,598,146 | 1/1997 | Schroder | 340/602 |
| 5,672,976 | 9/1997 | Egger et al. | 324/668 |

*Primary Examiner*—Jeffery A. Hofsass
*Assistant Examiner*—Ashok Mannaua
*Attorney, Agent, or Firm*—Martin A. Farber

[57] ABSTRACT

In a rain sensor system for a motor vehicle, a sensor element is provided as separate part for attachment in the vicinity of a vehicle window. The sensor element is wiped by a separate wiper blade which is fastened to a windshield wiper or driven by the latter. As a function of the a degree of wetness present on its top, the sensor element supplies electric signals to an evaluation electronics. Above a limit value of the signals, the evaluation electronics connects the windshield wiper.

13 Claims, 1 Drawing Sheet

RAIN SENSOR SYSTEM FOR A MOTOR VEHICLE

FIELD AND BACKGROUND OF THE INVENTION

The present invention relates a rain sensor system for a motor vehicle having a sensor element for detecting moisture on its surface and having an evaluation electronics connected with the sensor element by which, above a certain limit value of the moisture, a windshield wiper which wipes a window of the motor vehicle and the sensor element can be controlled.

Such rain sensors are used in modern motor vehicles and are thus known. In order to determine the degree of wetness, sensor elements are used which, for instance, change their ohmic resistance or their capacitance as a function of the degree of wetness present on their surface. Generally the sensor element consists of conductive paths applied to the windshield of the vehicle in the region of the windshield wiper. As a function of the degree of wetness the sensor element gives off an electric signal to the evaluation electronics located within the motor vehicle. Above a given limit value of the signal, the evaluation electronics activates the windshield wiper. Such rain sensors are used on windshields and rear windows of motor vehicles.

The known rain sensor has the disadvantage that the sensor element must be constructed by being integrated in or on the glass of the windshield or window. This results in a cost-intensive manufacture of the rain sensor together with the windshield and/or a high expense for the logistics. Furthermore, there is the disadvantage that an equipping of an existing motor vehicle, subsequent to its manufacture, with the known rain sensor is very expensive.

SUMMARY OF THE INVENTION

It is an object of the invention so to develop a rain sensor of the aforementioned type that, at the smallest possible expense, it can be used as original equipment on existing motor vehicles or else added to them subsequently to their manufacture.

According to the invention, the sensor element (9) is a separate component part developed for attachment in the vicinity of the windshield (1) of the motor vehicle, and the sensor element (9) has a separate wiper blade (8).

As a result of this development, the sensor element is not arranged directly on the windshield as in the case of the known rain sensors but is mounted as a separate part, for instance in front of the windshield. In this way, an existing motor vehicle can be particularly easily equipped with or supplemented by the rain sensor of the invention. The additional wiper blade removes the moisture present on the sensor element so that the windshield wiper is automatically disconnected after removal of the moisture. Furthermore, the expense for the manufacture of the windshields is greatly reduced as compared with the known rain sensor.

The sensor element is adapted to be arranged in a manner in accordance with the legal regulations and insofar as possible outside the viewing region of the driver of the motor vehicle so that the view of the driver is not unnecessarily impaired. The impairment of the view of the driver of the motor vehicle by the sensor element is particularly slight in accordance with one advantageous further development of the invention in which the sensor element (9) is developed for attachment to a guide sleeve (6) of the windshield wiper (2), which sleeve is fixed from rotation. In this way, it is even possible to fasten the sensor element in front of a part which adjoins the windshield, for instance a plate of the car body, so that the view of the driver is not impaired.

The sensor element can have a windshield wiper of its own, driven by a separate windshield wiper motor. However, in accordance with another advantageous embodiment of the invention, the rain sensor is used with particularly low cost and mounting expense on a motor vehicle if a separate wiper blade (8) for the sensor element (9) is adapted to be attached to the windshield wiper (2) or is connected to the windshield wiper (2) by a driver (17).

In accordance with another advantageous further feature of the invention, the windshield and the sensor element are cleaned at the same time if the rain sensor has a spray nozzle (16) which is directed on the sensor element (9) and which can be connected with a windshield washing system. In this way, each time that the windshield washing system is turned on, the windshield and the sensor element are simultaneously cleaned. Another advantage of the arrangement of the spray nozzle in front of the sensor element is that, upon operation of the windshield cleaning system, the windshield wiper is activated without additional control means and is deactivated again after the windshield has been cleaned.

The sensor element may optically detect a degree of wetness in the manner, for instance, wherein a photocell determines the reflectance of a surface. The rain sensor is, however, of particularly suitable construction and thus of low cost of manufacture if, in accordance with another advantageous embodiment of the invention, the sensor element (9) is developed so as to change its ohmic resistance or its capacitance upon a change in the degree of wetness. Furthermore, such a sensor element reacts very dependably to a change in the degree of wetness.

In accordance with another advantageous feature of the invention, the rain sensor is of particularly simple construction if the sensor element (9) has two adjacent conductive paths (13, 14) which are arranged parallel to each other.

In the same way as the known sensor elements, a sensor element could be applied on a pane of glass or else on a ceramic plate. The sensor element, however, is of particularly low weight if the conductive paths (13, 14) are arranged on or in a plastic plate (15) produced by injection molding, in accordance with another advantageous embodiment of the invention.

In accordance with another advantageous embodiment of the invention, the sensor element is of high strength if the plastic plate (15) is made of a thermosetting resin.

In the known rain sensor the connecting wires of the sensor element are frequently laid between the windshield and a gasket which is bonded to the windshield. This can be done subsequently, however, only by removal of the windshield. In accordance with another advantageous embodiment of the invention, the laying of the connecting wires of the sensor element is particularly simple if a connecting wire (10) for the sensor element (9) is conducted to the evaluation electronics (11) through a wiper shaft which is developed as a hollow shaft.

The subsequent application of the rain sensor of the invention to an existing motor vehicle is further simplified if the connecting wire is conducted to the evaluation electronics (11) through a structural part (body plate 3) adjoining the windshield (1).

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
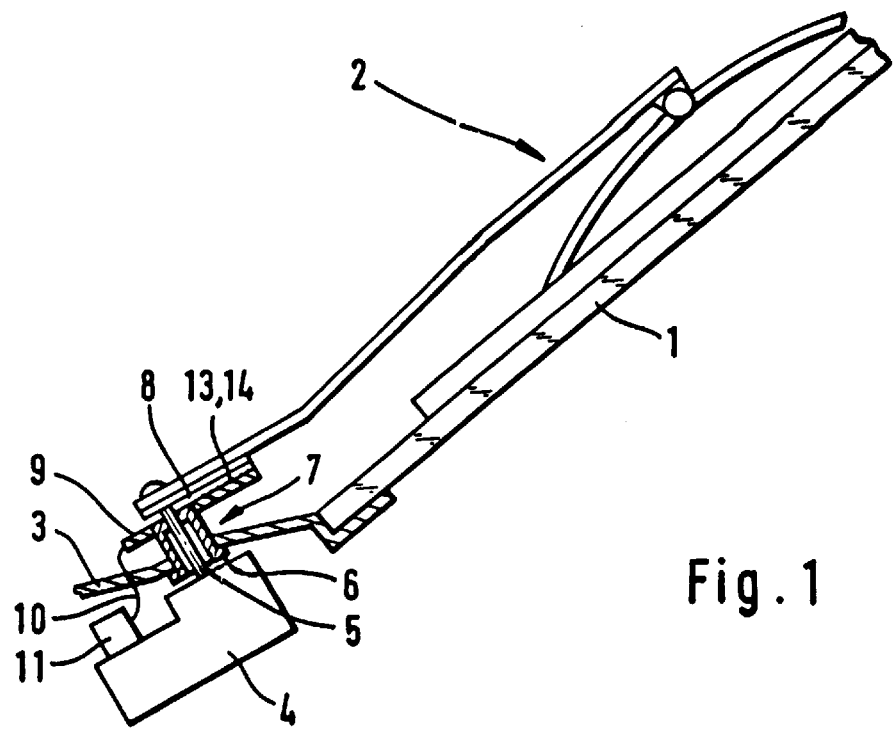
FIG. 1 is a side view, partially sectioned, of a rain sensor according to the invention and adjoining parts of a motor vehicle.

FIG. 1 shows a windshield wiper 2 resting against a windshield 1 of a motor vehicle. The windshield 1 is bonded to a plate 3 of the car body. Below the plate 3 there is arranged a windshield wiper motor 4 which drives the windshield wiper 2 via a motor shaft 5. The motor shaft 5 is surrounded by a guide sleeve 6 which is fastened in a recess 7 in the body plate 3. On the windshield wiper 2 there is fastened a wiper blade 8 which lies on a sensor element 9 which is firmly clamped on the guide sleeve 6. The sensor element 9 is connected by a connecting wire 10 which extends through the body plate 3 to an evaluation electronics 11 located on the windshield wiper motor 4.

As a function of the degree of moisture present on its surface, the sensor element 9 produces electric signals and conducts these signals over the connecting wire 10 to the evaluation electronics 11. When a limit value of the signals is exceeded, for instance in the case of rain, the evaluation electronics 11 turns on the windshield wiper motor 4. The windshield 1 and the sensor element 9 are wiped, respectively, by the windshield wiper 2 and the wiper blade 8. Subsequent to a wiping, the evaluation electronics 11 disconnects the windshield wiper motor 4.

By way of an alternative embodiment the wire 10 of the sensor element 9 may be routed through a hollow of the wiper shaft 5 to the evaluation electronics 11, schematically indicated in phantom by the wire 10A.

Figure 2:
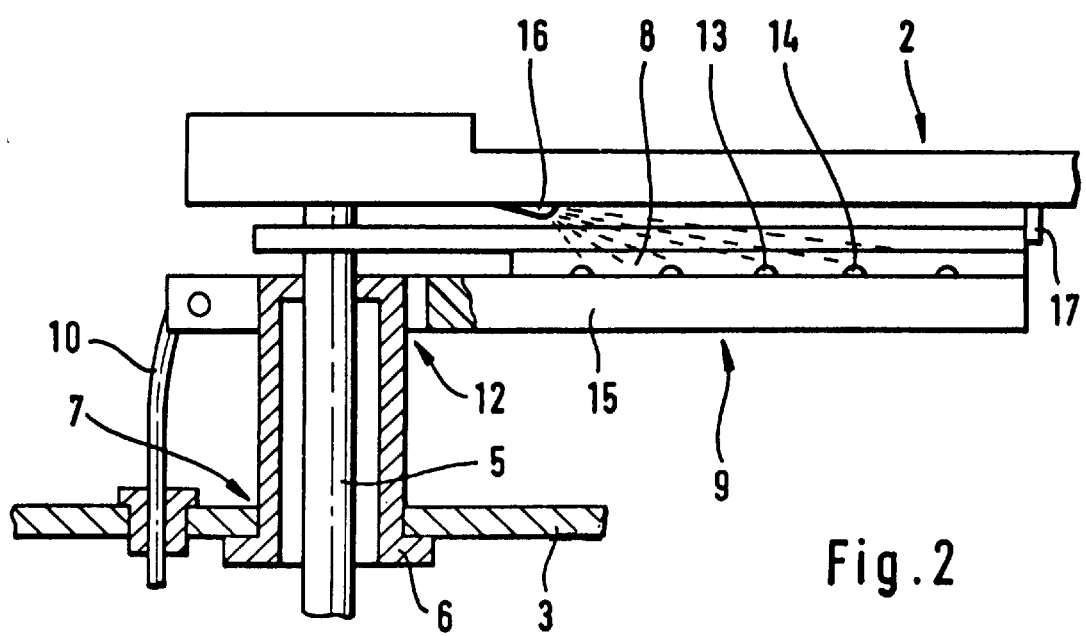
FIG. 2 is an enlarged view of a sensor element having a wiper blade according to FIG. 1.

FIG. 2 shows, in an enlarged view, the sensor element 9 fastened by a clamp 12 to the guide sleeve 6. The sensor element 9 consists essentially of a plastic board 15 having several conductive paths 13, 14 lying parallel to each other thereon. When two adjacent conductive paths 13, 14 are bridged over, for instance by a drop of rain, the evaluation electronics 11 shown in FIG. 1 receives a signal to start the windshield wiper 2. Furthermore, it can be noted in FIG. 2 that a spray nozzle of a wiper washer system (not shown) which nozzle is directed against the sensor element 9 is fastened on the windshield wiper 2. By means of this spray nozzle 16, dirt can be removed from the sensor element 9. Furthermore, the windshield wiper 2 can be briefly connected by an actuating of the windshield washing system. The driving of the wiper blade 8 is effected via a driver 17 which is fastened on the wiper blade 8 and partly surrounds the windshield wiper 2.

I claim:

1. A rain sensor system for a motor vehicle comprises:

a sensor element for detecting moisture on a surface of the sensor element;

an evaluation electronics which is connected with the sensor element and is operative, above a certain limit value of the moisture, to control a windshield wiper which wipes a windshield of the motor vehicle;

wherein the sensor element is separate from the windshield, and is adapted for attachment in the vicinity of the windshield of the motor vehicle;

the system further comprises a wiper blade, separate from the windshield wiper, for wiping the sensor element, the wiper blade and the windshield wiper being pivoted about a common axis of rotation and providing respective wipings during respective pivotings about the common axis of rotation;

a hollow shaft disposed coaxially with the common axis of rotation for supporting the windshield wiper and the wiper blade during a pivoting of the wiper blade and the windshield wiper about the common axis of rotation; and a driver element mechanically connecting the windshield wiper to the wiper blade to enable the windshield wiper to drive the wiper blade across the sensor element.

2. A rain sensor system according to claim 1, wherein the wiper blade for the sensor element is adapted to be attached to the windshield wiper.

3. A rain sensor system according to claim 1, further comprising a spray nozzle which is directed upon the sensor element, the spray nozzle being connectable with a windshield washing system, and wherein the windshield wiper supports the spray nozzle.

4. A rain sensor system according to claim 1, wherein the sensor element has an electrical characteristic which changes during operation of the sensor element, the electrical characteristic being ohmic resistance or capacitance which changes in result of a degree of wetness.

5. A rain sensor system according to claim 1, wherein the sensor element has two adjacent conductive paths which are arranged parallel to each other.

6. A rain sensor system according to claim 5, wherein the conductive paths are arranged on or in a plastic plate produced by injection molding.

7. A rain sensor system according to claim 6, wherein the plastic plate is made of a thermosetting resin.

8. A rain sensor system according to claim 1, further comprising:

a wire which connects between the sensor element and the evaluation electronics, the wire passing through a hollow of the wiper shaft.

9. A rain sensor system according to claim 1, further comprising:

a structural part adjoining the windshield for supporting the sensor element, and a wire which connects between the sensor element and the evaluation electronics, the wire passing through a hollow of the wiper shaft.

10. A rain sensor system according to claim 9, wherein the sensor element is located forward of a surface of the windshield.

11. A rain sensor system according to claim 1, wherein the sensor element is located forward of a surface of the windshield.

12. A rain sensor system according to claim 11, wherein the sensor element has two adjacent conductive paths which are arranged parallel to each other, the conductive paths are arranged on or in a plastic plate produced by injection molding, and the plastic plate is made of a thermosetting resin.

13. A rain sensor system for a motor vehicle comprises:

a sensor element for detecting moisture on a surface of the sensor element;

an evaluation electronics which is connected with the sensor element and is operative, above a certain limit value of the moisture, to control a windshield wiper which wipes a windshield of the motor vehicle;

wherein the element is separate from the windshield, and is adapted for attachment in the vicinity of a windshield of the motor vehicle; and the system further comprises a wiper blade, separate from the windshield wiper, for wiping the sensor element;

a fixed guide sleeve for the windshield wiper; and wherein the sensor element is adapted for attachment to the guide sleeve.

* * * * *